Figure 1:
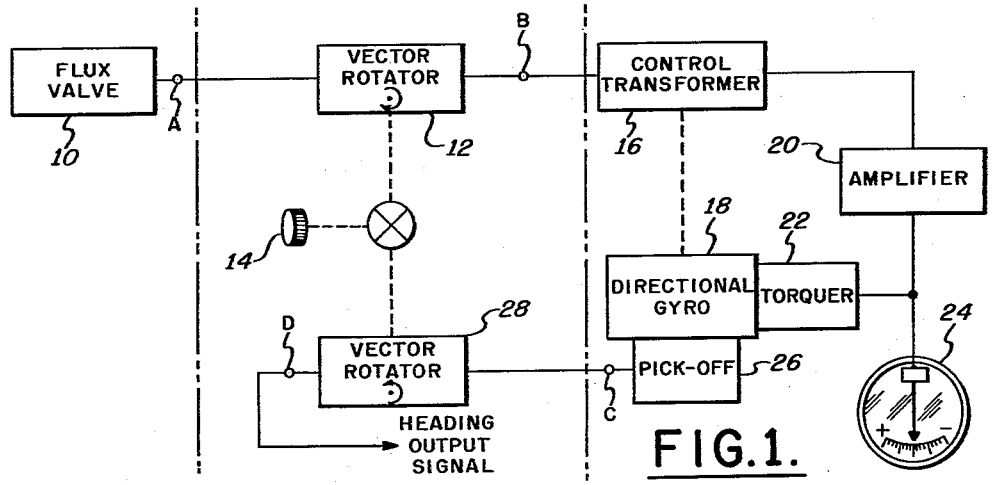

Oct. 8, 1963     W. N. BROOKS, JR., ETAL     3,106,025

GYRO MAGNETIC COMPASS SYSTEM

Filed April 14, 1961

INVENTORS
WILLIAM N. BROOKS JR.
JAMES R. DOHOGNE
BY

ATTORNEY

United States Patent Office 3,106,025
Patented Oct. 8, 1963

3,106,025
GYRO MAGNETIC COMPASS SYSTEM
William N. Brooks, Jr., and James R. Dohogne, Phoenix, Ariz., assignors to Sperry Rand Corporation, Great Neck, N.Y., a corporation of Delaware
Filed Apr. 14, 1961, Ser. No. 103,035
7 Claims. (Cl. 33—222)

This invention relates in general to heading indicating apparatus and more particularly to quick-setting or quick synchronization apparatus for use with a gyro magnetic compass system, such quick setting apparatus being necessary to align a gyroscope reference with a magnetic compass reference in minimum time.

In a gyro magnetic compass system of the type disclosed in U.S. Patent 2,357,319, issued on September 5, 1944, to O. E. Esval and C. Frische, and assigned to the assignee of this invention, a directional gyroscope is slaved to the magnetic field of the earth (sensed by a flux valve), by precessing the gyroscope whenever the gyroscope reference drifts from alignment with the magnetic compass reference. In normal slaved operation, small torques are applied to the gyroscope to position the gyroscope reference at a very slow rate, e.g. 3 degrees per minute; slow precession of the gyroscope reference prevents that reference from following short term, short duration errors in the direction of the magnetic compass reference as may result when the vehicle in which the system is installed maneuvers.

When power is first applied to a gyro magnetic compass system, the gyroscope and magnetic compass references may be substantially misaligned, thereby necessitating precession of the gyroscope to cancel such misalignment. With the normal slow precession rate of the gyroscope at this time, heading signals (which are provided by a suitable pick-off on the gyroscope), will be in error for considerable time. For example, with the gyroscope reference displaced 90 degrees from the magnetic compass reference, it will take a half hour for the gyroscope reference to precess to alignment with the magnetic compass reference if the gyroscope precession rate is the normal 3 degrees per minute. Therefore, means is usually provided whereby the gyroscope may be brought quickly into synchronism with the magnetic reference when power is applied initially to the system.

The present invention provides quick setting of a gyro magnetic compass system without resort to precession of the gyroscope and is based on the following fact: If, in a gyro magnetic compass system, the magnetic compass reference is rotated to alignment with a misaligned gyroscope reference (thereby preventing precession of the gyroscope) and a secondary gyro-stabilized reference normally aligned with the gyroscope reference is rotated equally, but in an opposite direction, the rotated secondary reference will be aligned in the direction of the unrotated magnetic compass reference and, therefore, can serve as the heading reference for the system. The cogency of this statement will be shown later.

A principal object of the invention is to provide apparatus for quickly setting or synchronizing a gyro magnetic compass system.

Another object of the invention is to provide apparatus for quickly setting a gyro magnetic compass system without precessing the gyroscope of the system, such apparatus being simple both in construction and in operation.

Another object of the invention is to provide a device which can be inserted readily into a conventional gyro magnetic compass system or adapted to existing installed systems to provide quick-setting of the system, such quick-setting being without resort to the complexities and extensive modifications heretofore required in synchronization systems of the type wherein gyroscope fast slaving techniques are employed.

Figure 3:
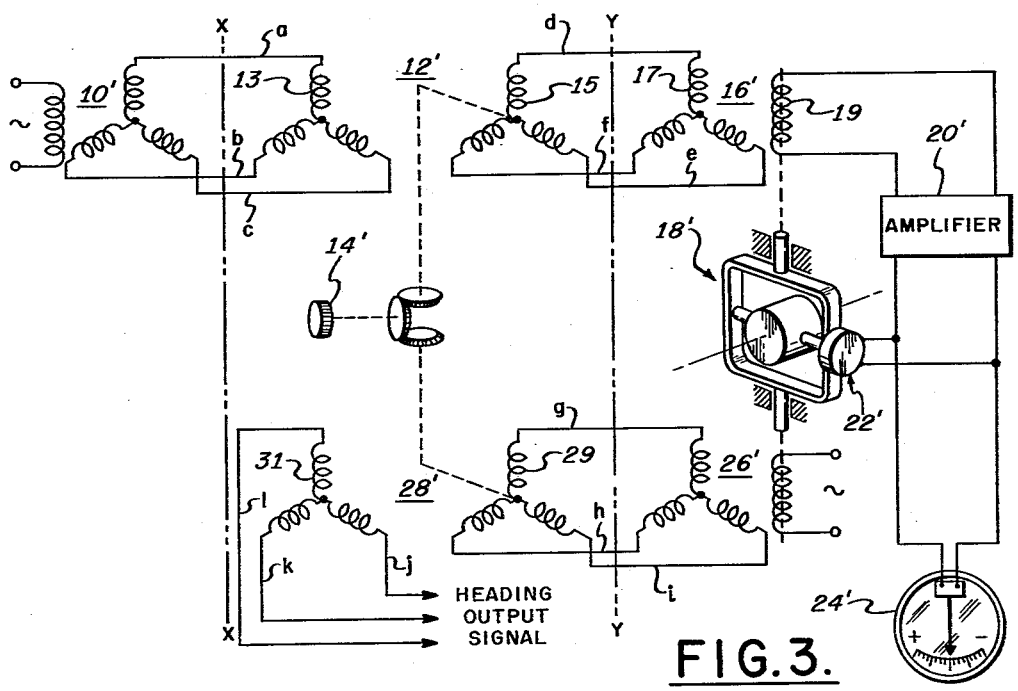
Figure 2:
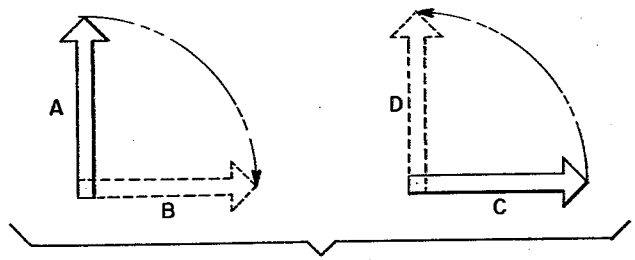

The invention will be described with reference to the figures wherein:

FIG. 1 is a block diagram of a gyro magnetic compass system employing the invention, FIG. 2 is a diagram useful in describing the present invention, and FIG. 3 is a schematic diagram of a presently preferred form of the invention.

Referring to FIG. 1, a flux valve 10 provides a magnetic compass reference signal representing the direction of the earth's magnetic field with respect to the craft on which it is mounted. This signal is applied to a vector rotator 12, one type of which is shown later. The vector rotator 12 produces a signal representing a rotatable reference, the rotational position of which may be varied or set by a knob 14. The vector rotator 12 output signal is applied to the stator of a control transformer 16 whose rotor is disposed to provide no output signal when the rotatable reference is aligned with a reference provided by a directional gyro 18. The output signal on the rotor of the control transformer 16 is applied to an amplifier 20 and, thence, simultaneously to a torquer 22 and an annunciator 24. As shown, the annunciator 24 is a meter which indicates the magnitude and sense of its applied signal. A pick-off 26 on the gyro 18 provides an output signal representing the gyroscope reference. The pick-off 26 output signal is applied to a vector rotator 28 which, being ganged to the vector rotator 12, rotates the gyroscope reference an amount equal to, but in a direction opposite to, the amount that the magnetic compass reference is rotated by the vector rotator 12.

In describing the operation of the apparatus of FIG. 1, reference should be made also to FIG. 2 which shows reference vectors that represent the signals appearing at points A through D of FIG. 1. With the gyroscope reference (vector C) misaligned ninety degrees with respect to the magnetic compass reference (vector A) when power is applied initially to the system, and with the annunciator indicating the presence of a gyro torquing signal, the knob 14 is rotated until that signal is cancelled. When such is the case, the vector rotator 12 provides a signal representing vector B, i.e. a vector aligned with the misaligned gyroscope reference (vector C), and the vector rotator 28 produces a signal representing vector D, i.e. a gyro stabilized reference aligned with the magnetic compass reference (vector A), which may serve as the basic heading reference for the overall system.

Referring to the schematic diagram of FIG. 3, a flux valve 10' applies its output reference signal to the stator 13 of a synchro differential 12'. The rotor 15 of the synchro differential 12' may be rotated by means of a knob 14', thereby providing a rotor output signal representing a rotatable reference; the knob 14' also rotates the rotor 29 of a synchro differential 28', the rotor 29 being disposed to rotate an amount equal to, but in a direction opposite to, the direction that the rotor 15 rotates. The output signal on the rotor 15 is applied to the stator 17 of a control transformer 16'. The rotor 19 of the control transformer 16' is adapted to be azimuthally stabilized by securing it to the vertical axis of a directional gyro 18', the stator 17 of the control transformer 16' being secured to the case of the gyroscope 18'. The rotor 19 output signal is applied to an amplifier 20' which, in turn, applies its output signal simultaneously to a torquer 22' and an annunciator 24'. A synchro pick-off 26', having its rotor azimuthally stabilized like the control transformer rotor 19 and its stator secured to the case of the gyroscope 18', applies a signal representing a gyroscope reference to the rotor 29 of the synchro differential 28'; since the rotor 29 is rotatable, so too is the reference that is represented by the signal applied to the rotor 29. The output signal on the rotor 29, then, is induced in the stator 31 for application to a heading indicator or a flight control system. Like the apparatus of FIG. 1, when the knob 14' is so rotated that the annunicator 24' has no applied signal, the reference represented by the signal provided by the differential stator 31 is aligned with the reference represented by the signal from the flux valve 10'.

Gyro magnetic compass systems of the type disclosed in U.S. Patent 2,357,319 may be modified readily to employ the present invention as follows: A package containing the apparatus appearing between the dashed lines X—X and Y—Y of FIG. 3 is mounted on or near the control panel of a vehicle employing the compass system. The package leads a, b, c are connected then to the system flux valve; the leads d, e, f are connected to the leads which normally receive the flux valve output signal. Finally, the output signal from the gyro magnetic compass system is applied to the package leads g, h, i, thereby permitting a system output signal to be taken from package leads j, k, l.

Though not shown, many other embodiments having the counter-rotating reference feature of the present invention are possible. For example: Instead of counter rotating the rotors 15 and 29 of the synchro differentials (see the discussion relating to FIG. 3), the rotors 15 and 29 may be rotated in the same direction if the connections to two of the leads of only one of the rotors are reversed. Also, the invention may be practiced without one, or both, of the synchro differentials 12' and 28'. For example, by making the pick-off 26' stator rotate counter to the direction that the rotor 15 rotates, the synchro differential 28' may be eliminated, i.e. the stator of the pick-off 26' will provide a signal representing the system heading reference. Similarly, the complete circuit contained between the dashed lines X—X and Y—Y can be eliminated if the respective stators of the control transformer 16' and the pick-off 26' are made counter rotatable such as by direct mechanical connection at the gyroscope component.

While the invention has been described in its preferred embodiments, it is to be understood that the words which have been used are words of description rather than of limitation and that other changes within the purview of the appended claims may be made also without departing from the true scope and spirit of the invention in its broader aspects.

What is claimed is:

1. Apparatus for use with a gyro magnetic compass system of the type wherein a comparison device compares a reference signal from a flux valve with a reference signal provided by a gyroscope to precess said gyroscope to cancel any error signal resulting from the comparison, comprising a first synchro differential having a stator and rotor, said stator and rotor respectively receiving said flux valve signal and applying an output signal to said comparison device, and a second synchro differential having a stator and rotor, said second synchro differential rotor receiving said gyroscope reference signal and said second synchro differential stator providing a signal representing a heading reference for the system, said first and second synchro differential rotors being disposed to rotate the references represented by the signals respectively thereon equally, but in counter directions, until said comparison device output error signal has been cancelled.

2. In a gyro magnetic compass system of the type wherein a comparison device compares a reference signal from a flux valve with a reference signal provided by a gyroscope to precess said gyroscope to cancel any error signal resulting from the comparison, a first synchro differential having a stator and rotor, said stator and rotor respectively being adapted to receive said flux valve signal and apply an output signal to said comparison device, and a second synchro differential having a stator and rotor, said second synchro differential rotor being adapted to receive said gyroscope reference signal and said second synchro differential stator being adapted to provide a signal representing a heading reference for the system, said first and second synchro differential rotors being disposed to rotate the references represented by the signals respectively thereon equally, but in counter directions, until said comparison device output error signal has been cancelled.

3. A gyro magnetic compass system comprising a flux valve, a first synchro differential having a stator and rotor, said stator receiving the output signal from said flux valve, a gyroscope connected for precession by a signal representing the misalignment between a reference produced by said gyroscope and a reference represented by the signal on the rotor of said first synchro differential, means adapted to produce a signal representing the gyroscope reference, a second synchro differential having a stator and rotor, said rotor receiving said gyroscope reference signal, and means for rotating both said rotors so that the references represented by the signals thereon may be counter rotated by equal amounts, said second synchro differential stator providing a signal representing a gyro stabilized heading reference.

4. Apparatus for use in a compass system comprising means for producing a signal representing a magnetic heading reference, first and second means for producing signals representing an inertial heading reference, means for simultaneously modifying said magnetic heading reference signal and said second inertial heading reference signal to cause the references that they respectively represent to counterrotate by equal amounts, and means for comparing the modified magnetic heading reference signal and said first inertial reference signal to produce an error signal for precessing said inertial heading reference into alignment with said modified magnetic heading reference, whereby the signal provided by said means for producing a second inertial heading reference signal is an output signal correctly representative of actual heading when the reference represented by the signal produced by said means for producing a signal representing a magnetic heading reference is so rotated that said comparing means produces no output signal.

5. Apparatus for use in a compass system comprising means for producing a signal representing a magnetic heading reference, first and second means for producing signals representing an inertial heading reference, means for simultaneously modifying said magnetic heading reference signal and said second inertial heading reference signal to cause the references that they respectively represent to counterrotate by equal amounts, and means for comparing the modified magnetic heading reference signal and said first inertial reference signal to produce an error signal for precessing said inertial heading reference into alignment with said modified magnetic heading reference, means for measuring the magnitude of said error signal, whereby the signal provided by said means for producing a second inertial heading reference signal is an output signal correctly representative of actual heading when the reference represented by the signal provided by said means for producing a signal representing a magnetic heading reference is so rotated that said means for measuring the magnitude of said error signal has no signal applied thereto.

6. A compass system comprising a flux valve for producing a signal representing a magnetic heading reference, a directional gyro, a pick-off for producing a signal representative of the gyro heading reference, means for simultaneously modifying said magnetic heading reference signal and said gyro pick-off signal to cause the references that they respectively represent to counterrotate by equal amounts, and a control transformer producing an error signal for precessing said directional gyro so that its reference is aligned with the modified magnetic heading reference, whereby the signal provided by said pick-off is an output signal representative of actual heading when the reference represented by said flux valve signal is so rotated that said control transformer produces no output signal.

7. The apparatus of claim 6 wherein said means for simultaneously modifying said reference signals comprises first and second counterrotatable synchros, the stator of said first synchro being connected to receive the flux valve signal and the rotor of said first synchro applying its output signal to said control transformer, the rotor of said second synchro being connected to receive the pick-off signal, and the signal on the stator of said second synchro being the output heading signal for the system.

References Cited in the file of this patent

UNITED STATES PATENTS 2,357,319   Esval et al. _____ Sept. 5, 1944

FOREIGN PATENTS 586,506   Great Britain _____ Mar. 20, 1947
204,146   Australia _____ Nov. 15, 1956